US008556561B2

(12) United States Patent
Norton

(10) Patent No.: US 8,556,561 B2
(45) Date of Patent: Oct. 15, 2013

(54) WINDAGE SHIELD

(75) Inventor: Giles D. Norton, Bristol (GB)

(73) Assignee: Rolls-Royce PLC, London (GB)

( * ) Notice: Subject to any disclaimer, the term of this patent is extended or adjusted under 35 U.S.C. 154(b) by 67 days.

(21) Appl. No.: 13/428,684

(22) Filed: Mar. 23, 2012

(65) Prior Publication Data

US 2012/0257958 A1 Oct. 11, 2012

(30) Foreign Application Priority Data

Apr. 7, 2011 (GB) .................................. 1105860.9

(51) Int. Cl.
*F16B 37/14* (2006.01)

(52) U.S. Cl.
USPC ........................................ 411/372.5; 411/548

(58) Field of Classification Search
USPC ................. 411/372.5, 373, 374, 548, DIG. 3; 415/108
See application file for complete search history.

(56) References Cited

U.S. PATENT DOCUMENTS

| | | | | |
|---|---|---|---|---|
| 4,190,397 | A | 2/1980 | Schilling et al. | |
| 4,662,821 | A | 5/1987 | Kervistin et al. | |
| 5,090,865 | A | 2/1992 | Ramachandran et al. | |
| 5,259,725 | A | 11/1993 | Hemmelgarn et al. | |
| 5,573,378 | A | 11/1996 | Barcza | |
| 7,094,020 | B2 | 8/2006 | Dong et al. | |
| 7,249,463 | B2 | 7/2007 | Anderson et al. | |
| 2006/0056957 | A1 * | 3/2006 | Dong et al. | 415/110 |

FOREIGN PATENT DOCUMENTS

| | | |
|---|---|---|
| CH | 600 182 | 6/1978 |
| EP | 2 182 227 A1 | 5/2010 |

OTHER PUBLICATIONS

British Search Report dated Aug. 3, 2011 issued in British Patent Application No. 1105860.9.

* cited by examiner

*Primary Examiner* — Roberta Delisle
(74) *Attorney, Agent, or Firm* — Oliff & Berridge, PLC

(57) ABSTRACT

A windage shield 2 for an array of fasteners 34, the shield 2 comprising a channel 4 for accommodating portions of the fasteners 34 extending into a fluid flow path. The windage shield 2 also comprises a closure flap 12 which extends between opposite side walls 8, 10 of the channel 4 to enclose the interior of the channel 4. The closure flap 12 is displaceable away from at least one of the side walls 8, 10 to provide access to at least one of the fastener portions 34.

10 Claims, 2 Drawing Sheets

WINDAGE SHIELD

This invention relates to a windage shield for a circular array of fasteners.

Gas turbine engines are operated at high temperatures which require certain components, for example turbine blades, to operate in ambient temperatures which exceed the melting point of the material from which they are made. A solution to this problem is to cool the components using cooling air supplied through flow passages in the blades. Typically, cooling air is bled from the engine compressor, which is at a lower temperature than the turbine, and supplied through ducts through the engine to the turbine blades. The effectiveness of the cooling is dependent on the temperature of the cooling air arriving at the turbine blades. It is therefore important to minimise heating of the cooling air as it passes through the engine.

It is known that air turbulence and drag increase the temperature of the cooling air as the cooling air travels through the ducts. Known sources of turbulence are fasteners, such as nuts and bolts, which fasten adjacent sections of the engine together. These fasteners are generally located within, or project into, the ducts to allow easy access to the fasteners from within the ducts. As the flow passes over exposed portions of the fasteners it becomes turbulent. The turbulence causes the cooling air to perform work which increases the temperature of the air and hence reduces its cooling effectiveness. This can be particularly problematic in annular ducts in which the cooling air has a rotational flow component imparted by the compressor which increases interference with the fasteners.

Windage shields may be used to cover or modify the shape of the fasteners in order to reduce the amount of turbulence and hence heating of the cooling air. Various types of windage shields have been proposed.

U.S. Pat. No. 7,094,020 discloses a windage shield comprising a mounting flange which locates behind a nut of a nut-and-bolt arrangement, and a curved upstream-facing cover which diverts flow over the nut to reduce drag and heating of the nut and bolt. A problem associated with the windage shield is that it obstructs access to the nut.

U.S. Pat. No. 5,259,725 discloses a shield which, together with a sidewall of the engine casing, defines a protective cavity about a fastener. The shield locates in recesses in the engine casing. Once located in the recesses, the shield is locked in position by a locking wire extending between opposing grooves in the shield and the casing. A problem with the shield arrangement is that it is complex and requires the shield to be unlocked and subsequently removed to access the fastener.

U.S. Pat. No. 4,190,397 discloses a windage shield having a plurality of circumferentially spaced slots for receiving specially adapted bolt heads. The thickness of the bolt heads and the depths of the slots are similar so that when the bolt heads are located within the slots they are flush with the shield. The arrangement is unsuitable for the nuts fastened to the bolts because it would inhibit spanner access to the nut.

U.S. Pat. No. 5,090,865 and U.S. Pat. No. 4,662,821 disclose similar types of windage shields.

According to a first aspect of the present invention there is provided a windage shield for an array of fasteners, the shield comprising a channel for accommodating portions of the fasteners extending into a fluid flow path, and a closure flap extending between opposite side walls of the channel to enclose the interior of the channel, the closure flap being displaceable away from at least one of the side walls to provide access to at least one of the fastener portions.

The closure flap may be mounted on one of the side walls which comprises a supporting side wall and is resiliently biased towards the other side wall which comprises an abutment side wall.

The flap may comprise a flexible resilient material, the resilience of the material providing the bias. The resilient material may be a high-temperature fluoroelastomer.

The closure flap may be secured to an outer surface of the supporting side wall. The outer surface of the supporting side wall may be profiled so as to be inclined towards the abutment side wall in the direction towards the free edge of the supporting side wall. The closure flap may be bonded to the supporting side wall.

The channel and the closure flap may be annular, so that the windage shield can be used with a circular array of fasteners. The supporting side wall may be disposed radially inwards of the abutment side wall.

The channel may comprise a base from which the side walls extend, the base having openings for receiving the fasteners.

Where the closure flap is secured to an outer surface of the supporting side wall, the flap may be secured to the supporting side wall at a position adjacent the base.

According to a second aspect of the present invention there is provided a machine having a rotatable component, the machine comprising an array of fasteners disposed on or adjacent to the rotatable component, the portions of the fasteners being accommodated within a windage shield in accordance with the first aspect of the invention.

The machine may be a gas turbine engine comprising a compressor disc fastened to a driveshaft by the array of fasteners.

For a better understanding of the present invention, and to show more clearly how it may be carried into effect, reference will now be made, by way of example, to the accompanying drawings, in which.

Figure 1:
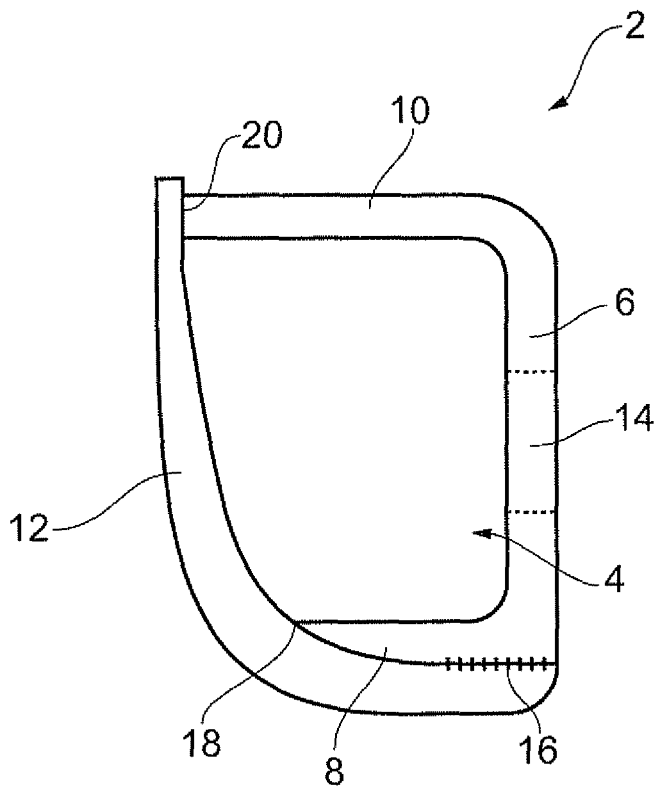
FIG. 1 is a partial sectional view of a windage shield.

FIG. 1 shows a windage shield 2 for a circular array of fasteners (not shown). The shield 2 comprises an annular channel 4 and an annular closure flap 12. The annular channel is formed by a metallic ring having a base 6, a support wall 8 and an abutment wall 10. The closure flap 12 extends between the support wall 8 and the abutment wall 10 to enclose the interior of the channel 4. The support wall 8 comprises a radially inner side wall of the annular channel 4 and the abutment wall 10 comprises a radially outer side wall of the annular channel 4. A circular array of openings 14 is provided in the base 6. The openings 14 are spaced apart from each other in the circumferential direction of the base 6.

The closure flap 12 is bonded to an outer surface region 16 of the support wall 8 at a portion of the support wall 8 which is adjacent the base 6. The closure flap 12 extends from the base 6, along the outer surface of the support wall 8 and over a free edge 18 of the support wall 8 towards a free edge 20 of the abutment wall 10. The support wall 8 supports the portion of the closure flap 12 which extends along the support wall 8. The support wall 8 is profiled so that the outer surface is inclined towards the abutment wall 10 in the direction towards the free edge 18 of the support wall 8.

The closure flap 12 is curved over the free edge 18 of the support wall 8 and abuts the free edge 20 of the abutment wall 10 to enclose the interior of the channel 4. The closure flap 12 and the channel 4 define an annular cavity.

The closure flap 12 comprises a flexible resilient material. The closure flap 12 may comprise a material which is resistant to ambient temperatures present in a cooling air flow path through a gas turbine engine. For example, the closure flap 12 may comprise a high-temperature fluoroelastomer. A windage shield 2 in which the closure flap 12 is made of a high-temperature fluoroelastomer would be particularly suitable for use in conditions in which the ambient temperature does not exceed 300° C.

Figure 2:
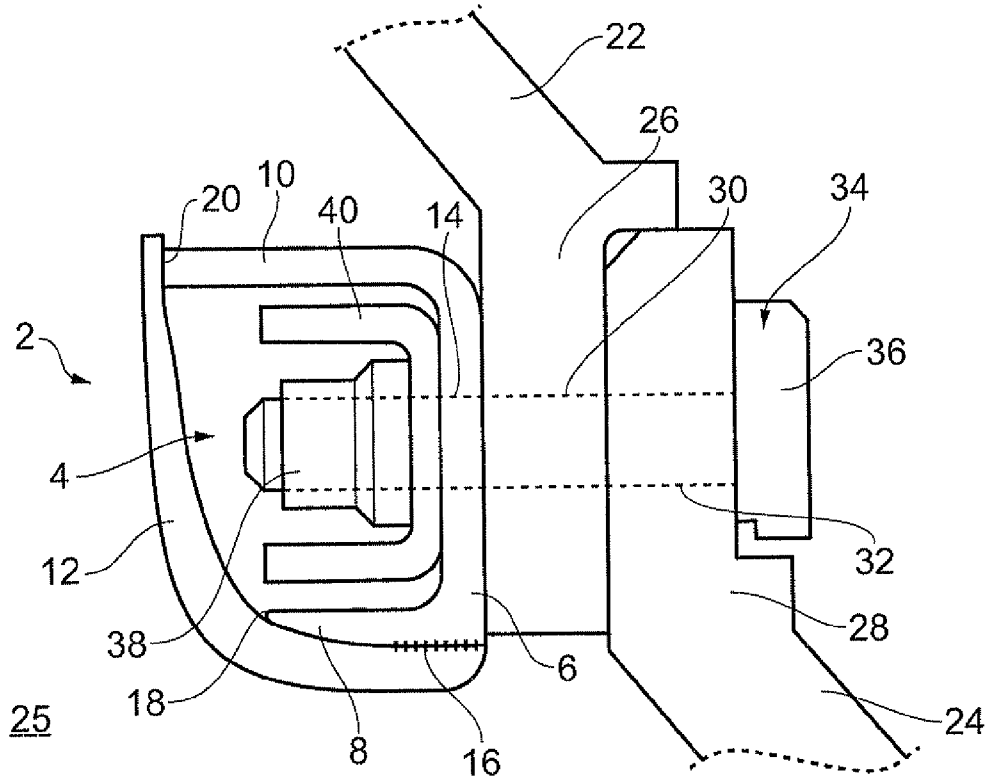
FIG. 2 is a partial sectional view of an arrangement comprising the windage shield shown in FIG. 1.

FIG. 2 is a partial sectional view of a compressor disc 22 fastened to a turbine driveshaft 24 of a gas turbine engine. The compressor disc 22 and the turbine driveshaft 24 define a wall of a duct 25 for transferring cooling air from the compressor of the engine (not shown). The compressor disc 22 and turbine driveshaft 24 are provided with respective radially extending flange portions 26, 28. Each flange portion 26, 28 has a circular array of openings 30, 32 which corresponds to the circular array of openings 14 in the base 6 of the windage shield 2. The flange portions 26, 28 are arranged to abut each other and the windage shield 2 is arranged so that the base 6 abuts a face of the flange portion 26 of the compressor disc 22 which is opposite the face abutting the flange portion 28 of the turbine driveshaft 24. The compressor disc 22, turbine driveshaft 24 and windage shield 2 are also arranged so that the openings 14, 30, 32 in the flange portions 26, 28 and the base 6 are aligned.

The flange portions 26, 28 and the windage shield 2 are secured together by fasteners 34. Each fastener 34 comprises a bolt 36 and a nut 38. As shown in FIG. 2, each bolt 36 extends through aligned openings 14, 30, 32 in the flange portions 22, 24 and the base 6. The head of the bolt 36 abuts the flange portion 28 of the turbine driveshaft 24. The end of the bolt 36 opposite the head projects into the channel 4 of the windage shield 2.

The nut 38 is provided on the portion of the bolt 36 which extends into the channel 4. A washer element 40 is disposed between the nut 38 and the base 6 of the channel 4. The nut 38 is located within the interior of the channel 4 and is enclosed within the channel 4 by the closure flap 12. The nut 38 and the bolt 36 clamp the base 6 and the flange portions 26, 28 together. The closure flap 12 and the channel 4 define an enclosed cavity which accommodates the nut 38 and the portion of bolt 36 which extends into the channel 4 and shields them from the surrounding airflow. The windage shield 2 presents a uniform axially symmetric profile to the internal cooling air system, thereby minimising friction losses arising from interaction between the fasteners 34 and the cooling air which would otherwise heat the cooling air.

Furthermore, the cooling air may be at a temperature which is higher than surrounding areas of the engine. By preventing cooling air from washing over the fasteners 34, heating of the fasteners 34 is reduced and heat transfer through the fasteners 34 to surrounding areas, for example areas containing telemetry equipment which is sensitive to temperature fluctuation, is minimised.

The closure flap 12 is prised away from the abutment wall 10 in order to access each nut 38 (e.g. for assembly, disassembly or adjustment). The closure flap 12 can be prised back to the bonded region 16 at the base 6. This allows for the closure flap 12 to be forced back over the free edge 18 of the support wall 8, which provides unfettered access to the nut 38 (e.g. for tightening, adjustment or removal of the nut 38). The closure flap 12 may be prised away from the abutment wall 10 to provide access to all of the nuts 38 or prised away in the region of one or a selection of nuts 38 to provide access to the or those nuts 38. Once released, the closure flap 12 returns under the resilience of the closure flap 12 to abut the abutment wall 10 and enclose the interior of the channel 4 and the portion of the fastener 34 within.

In operation of the engine, the windage shield 2 rotates with the compressor disc 22 and turbine driveshaft 24. Because the closure flap 12 extends radially outwardly from the support wall 8 towards the abutment wall 10, the centrifugal loads acting on the closure flap 12 urge the flap 12 into engagement with the abutment wall 10 to enclose the interior of the channel 4. The support wall 8 and the abutment wall 10 provide support so that the closure flap 12 does not deform under its own weight. In order to further prevent deformation of the shield, the annular channel may instead be made as a counterbored ring in order to provide additional support beneath the shield between adjacent fasteners, the material between counterbores providing the additional support.

It will be appreciated that a windage shield could be disposed to accommodate the bolt head. The windage shield would also be suitable for use with other types of fastener in which at least a portion of the fastener projects into an airflow and access to the fastener is required on an intermittent basis.

The windage shield could be applied to other types of devices, in particular electrical machines such as motors and generators, in which annular arrays of bolts are used and are exposed to an airflow, for example a rotating airflow.

The closure flap may comprise resilient materials other than fluoroelastomers which are suitable for specific ambient conditions. The channel may be made from a metallic material.

The invention claimed is:

1. A windage shield for an array of fasteners, the shield comprising an annular channel for accommodating portions of the fasteners extending into a fluid flow path, and an annular closure flap extending between opposite side walls of the channel to enclose the interior of the channel, the closure flap being displaceable away from at least one of the side walls to provide access to at least one of the fastener portions.

2. A windage shield as claimed in claim 1, wherein the closure flap is mounted on one of the side walls which comprises a supporting side wall and is resiliently biased towards the other side wall which comprises an abutment side wall.

3. A windage shield as claimed in claim 2, wherein the flap comprises a flexible resilient material, the resilience of the material providing the bias.

4. A windage shield as claimed in claim 3, wherein the resilient material is a high-temperature fluoroelastomer.

5. A windage shield as claimed in claim 2, wherein the closure flap is secured to an outer surface of the supporting side wall.

6. A windage shield as claimed in claim 5, wherein the outer surface of the supporting side wall is profiled so as to be inclined towards the abutment side wall in the direction towards the free edge of the supporting side wall.

7. A windage shield as claimed in claim 2, wherein the closure flap is bonded to the supporting side wall.

8. A windage shield as claimed in claim 1, wherein the supporting side wall is disposed radially inwards of the abutment side wall.

9. A windage shield as claimed in claim 1, wherein the channel comprises a base from which the side walls extend, the base having openings for receiving the fasteners.

10. A windage shield as claimed in claim 9, wherein the flap is secured to the supporting side wall at a position adjacent the base.

* * * * *